United States Patent [19]

Suzuki et al.

[11] Patent Number: 5,630,573
[45] Date of Patent: May 20, 1997

[54] FLUID-FILLED VIBRATION ISOLATOR

[75] Inventors: Tatsuo Suzuki; Osamu Nakagaki; Futoshi Namima, all of Nakashima-gun, Japan

[73] Assignee: Toyoda Gosei Co., Ltd., Nishikasugai-gun, Japan

[21] Appl. No.: 350,844

[22] Filed: Dec. 7, 1994

[30] Foreign Application Priority Data

Dec. 20, 1993 [JP] Japan ................................. 5-345196

[51] Int. Cl.⁶ ............................................. F16F 13/00
[52] U.S. Cl. ................................. 267/140.13; 267/219
[58] Field of Search ............................... 267/35, 64.19, 267/64.23, 64.27, 140.13, 140.14, 217, 219; 248/562, 636

[56] References Cited

U.S. PATENT DOCUMENTS

| 4,721,292 | 1/1988 | Saito ................................. 248/562 X |
| 5,094,433 | 3/1992 | Dan et al. ........................... 248/636 X |

FOREIGN PATENT DOCUMENTS

| 360113835 | 6/1985 | Japan ................................. 267/140.13 |
| 361055429 | 3/1986 | Japan ................................. 267/140.13 |
| 197833 | 9/1986 | Japan ................................. 248/562 |
| 402236036 | 9/1990 | Japan ................................. 267/140.13 |
| 402225838 | 9/1990 | Japan ................................. 267/140.13 |
| 2292539 | 12/1990 | Japan . |
| 403292431 | 12/1991 | Japan ................................. 267/140.13 |
| 439444 | 4/1992 | Japan . |

*Primary Examiner*—Matthew C. Graham
*Attorney, Agent, or Firm*—Cushman Darby & Cushman Intellectual Property Group of Pillsbury Madison & Sutro LLP

[57] ABSTRACT

A fluid-filled vibration isolator includes a hollow, thick-walled, rubber body which opens downwardly, an annular side plate which has an upper part bonded to an outer surface of the rubber body, a bottom plate sealed to a lower end edge of the cylindrical side plate by caulking, a partition, and a rubber diaphragm. Peripheral edges of the partition and the diaphragm are both strongly sandwiched by the lower end edge to define a main fluid chamber between the rubber body and the partition and an auxiliary fluid chamber between the partition and the rubber diaphragm. A lower part of the side plate inclines obliquely and outwardly toward the lower end edges. A peripheral part of the partition bends into an L-shaped cross-section and contacts the obliquely and outwardly inclining lower part to define an annular space having a closed triangular cross-section. The annular space is blocked circumferentially by a projecting wall formed in the partition. The annular space opens into the main fluid chamber through a recess formed in the partition adjacent to the projecting wall and opens into the auxiliary fluid chamber through a through hole formed in the partition on the side of the projecting wall opposite to the recess to define a throttle passage interconnecting the main fluid chamber and the auxiliary fluid chamber.

10 Claims, 5 Drawing Sheets

FLUID-FILLED VIBRATION ISOLATOR

The basic foreign Application filed Dec. 20, 1993, No. 5-345196, in Japan is hereby incorporated by reference.

BACKGROUND OF THE INVENTION

1. Field of the Invention

The present invention relates to a fluid-filled vibration isolator and, more particularly, to a fluid-filled vibration isolator having excellent durability which is manufactured at low cost.

2. Description of Related Art

A fluid-filled vibration isolator generally includes two fluid chambers separated by a partition interconnected by a throttle passage provided in the partition. Upon input of vibration, walls defining the fluid chambers deform thus forcing a working fluid through the throttle passage and thereby damping the input vibration.

In order to reduce the weight of the above-described fluid-filled vibration isolator, it has been proposed to compose the partition and throttle passage of a pair of superimposed thin plates. One example of such a fluid-filled vibration isolator is disclosed in Japanese Patent application laid-open No. Hei 2-292539 and is illustrated in FIG. 5.

As shown, a mounting member 12 is embedded centrally in a hollow, thick-walled, rubber body 10 forming an engine mount. An annular side plate 16 is bonded to an outer surface of the rubber body 10 at its radially enlarged upper part. A lower part 14 of the annular side plate 16 extends vertically below the upper part. A lower end edge 18 of the side plate 16 first bends horizontally and outwardly and then bends vertically and downwardly into a generally C-shaped cross-section. The lower end edge 18 is secured to a peripheral edge of a bottom plate 20 by caulking. A mounting bolt 22 penetrates an axial center of the bottom plate 20.

Peripheral edges of both a partition 24 and a rubber diaphragm 26 are joined and sandwiched strongly by the lower end edge 18. A working fluid is sealed within a closed space defined by the rubber body 10 and the rubber diaphragm 26 such that a main fluid chamber 28 and an auxiliary fluid chamber 30 are formed by the partition 24.

The partition 24 is composed of two thin plates 32 and 34. The peripheral edges of the two thin plates 32 and 34 first bend downwardly and then horizontally. The horizontal edge portions are secured with the rubber diaphragm 26 by the lower and edge 18. The vertical peripheral edges of the two plates 32 and 34 define a closed annular space S. The closed annular space S opens into the main fluid chamber 28 and the auxiliary fluid chamber 30 thereby forming a throttle passage.

This isolator, however, requires troublesome press-forming, positioning and welding of the two thin plates 32 and 34 which increases manufacturing costs.

Another example of a lightweight, fluid-filled vibration isolator is disclosed in Japanese Utility Model application laid-open No. Hei4-39444, and is illustrated in FIG. 6. As shown, a partition 24 is composed of a single thin plate providing simple construction of the device and reduced weight. The partition 24 folds and further bends into an L-shaped cross-section. The folding part 36 abuts an inner surface of the rubber body 10, and the peripheral edge of the partition 24 is secured by the lower end edge 18. The inner surface of the side plate 14 and the L-shaped part of the partition 24 define a closed annular space S having a triangular cross-section. The closed annular space S opens into the main fluid chamber 28 and the auxiliary fluid chamber 30 thereby forming a throttle passage.

This isolator, however, cannot be formed easily because the folding part 36 must be deep drawn which increases the manufacturing costs.

Furthermore, in each example, the lower part of the side plate 14 bends at right angles, as shown by arrow A in FIG. 5, which causes stress concentrations in a single corner of the side plate 14 upon vibration, and accordingly, the durability of the device is decreased.

SUMMARY OF THE INVENTION

Accordingly, it is an object of the present invention to provide a fluid-filled vibration isolator which can be manufactured easily at low cost with excellent durability.

The fluid-filled vibration isolator of the present invention includes a hollow, thick-walled, rubber body which opens downwardly, an annular side plate which has an upper part bonded to an outer surface of the rubber body, a bottom plate secured to a lower end edge of the annular side plate, a partition, and a rubber diaphragm of which peripheral edges are sandwiched strongly by the lower end edge. The partition defines a main fluid chamber with the rubber body on the upper side thereof and defines an auxiliary fluid chamber with the rubber diaphragm on the lower side thereof. A lower part of the side plate inclines obliquely and outwardly toward the lower end edge. A peripheral edge of the partition bends into an L-shaped cross-section whereby an annular space is defined between the lower part of the side plate and the peripheral edge of the partition. The annular space opens into both the main fluid chamber and the auxiliary fluid chamber at predetermined positions to form a throttle passage.

More particularly, the annular space composing the throttle passage is defined between the obliquely and outwardly inclining lower part of the side plate and the L-shaped peripheral part of the partition. This geometry enables the partition to be formed easily from a single plate by press-forming without any positioning, welding, deep drawing or other troublesome work. Accordingly, the manufacturing costs of the device are inexpensive.

In addition, the obliquely and outwardly inclining lower part of the side plate forms two corners which increases the durability of the side plate. As compared with the conventional side plate having a single corner, the present invention increases durability because the stress generated upon input of vibration can be dispersed through the two corners.

Other objects, features, and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
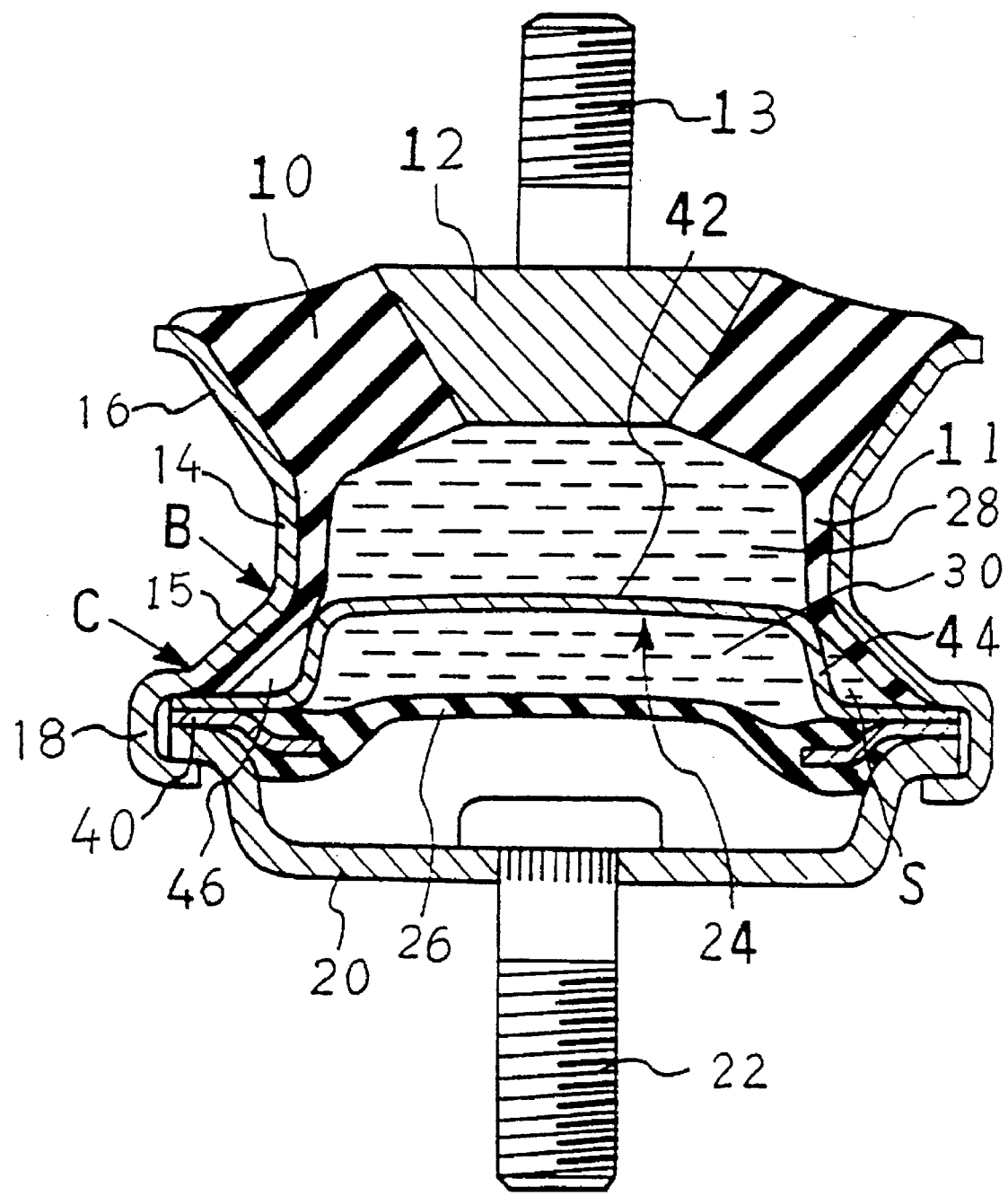
FIG. 1 is a longitudinal sectional view of a first embodiment of a fluid-filled vibration isolator in accordance with the present invention.
Figure 2:
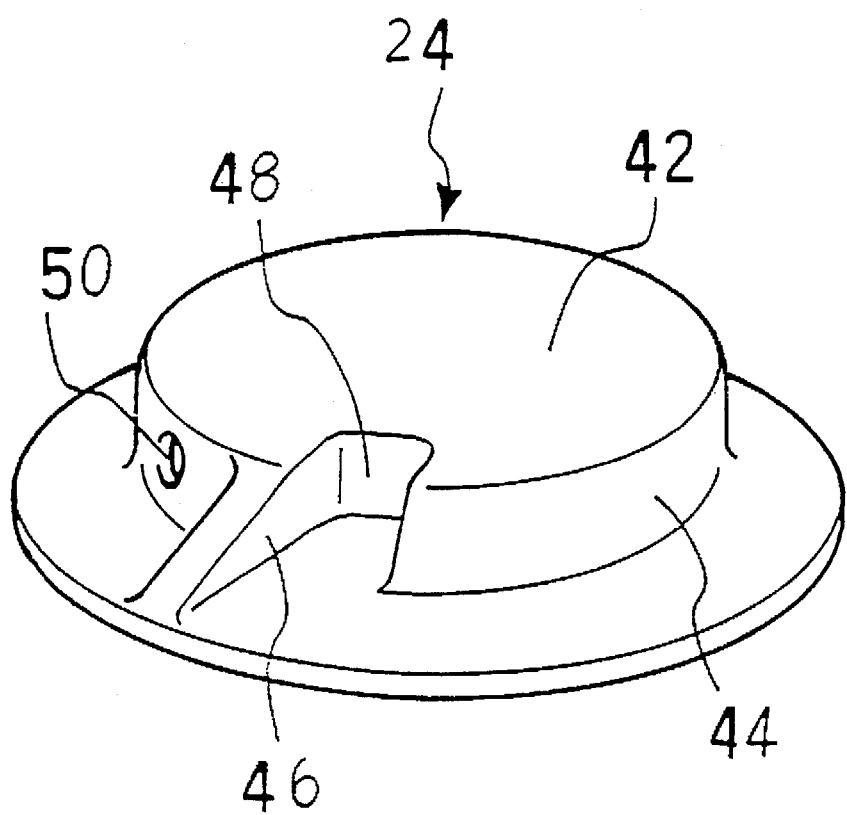
FIG. 2 is a perspective view of a partition used in the isolator of FIG. 1.

FIGS. 1 and 2 illustrate a first embodiment of a fluid-filled vibration isolator in accordance with the present invention. In FIG. 1, an outer surface of a hollow, thick-walled, rubber body 10 is bonded to a radially enlarged upper part 16 of a annular side plate 14. The rubber body 10 extends downwardly along an inner surface of the side plate 14 to define a rubber layer 11. A mounting member 12 is embedded in a central portion of the rubber body 10. An engine (not shown) is mounted on the mounting member 12 and fixed thereto by a mounting bolt 13.

A lower part 15 of the side plate 14 inclines obliquely and outwardly. A lower end edge 18 bends into a C-shaped cross-section and is sealed to a peripheral edge of a bottom plate 20 by caulking. The lower end edge 18 strongly sandwiches peripheral edges of a partition 24 and a ring-shaped insert 40 embedded in a peripheral edge of a rubber diaphragm 26. A cylindrical space defined by the side plate 14, the rubber body 10, and the rubber diaphragm 26 is filled with a working fluid. A main fluid chamber 28 defined by the partition 24 and the rubber body 10 and an auxiliary fluid chamber 30 defined by the partition 24 and the rubber diaphragm 26 are formed when the diaphragm 26 and the partition 24 are assembled to the lower end edge 18. The bottom plate 20 is secured to a vehicle frame (not shown) by a mounting bolt 22 penetrating an axial center thereof.

The partition 24, as illustrated in FIG. 2, is formed from a single plate by press-forming. The partition 24 has a substantially circular, hat-like configuration. It is composed of a circular central part 42 and an a cylindrical part 44 which bends downwardly from the central part 42 at substantially right angles. The partition 24 further extends horizontally and outwardly as shown in FIG. 1. As installed, a peripheral edge of the central part 42 contacts the rubber layer 11 thereby defining an annular space S of a closed triangular cross-section with the inclining lower part 15.

The annular space S is blocked circumferentially by a projecting wall 46 (FIG. 2) formed in the cylindrical part 44. The top face of the projecting wall 46 inclines parallel to the inclining lower part 15 and contacts continuously against the rubber layer 11.

As shown in FIG. 2, the central part 42 has a rectangular recess 48 adjacent to the projecting wall 46. The annular space S opens into the main fluid chamber 28 by way of the recess 48. A through hole 50 is formed in an upright wall of the cylindrical part 44 on a side of the projecting wall 36 opposite to the recess 48. The annular space S opens into the auxiliary fluid chamber 30 by way of the through hole 50. Thus, a throttle passage interconnecting the fluid chambers 28 and throttle 30 is formed.

Upon input of engine vibration into the fluid-filled vibration isolator having the above arrangement, the rubber body 10 deforms to increase and decrease the volume of the main fluid chamber 28. Such action forces the working fluid within the main fluid chamber 28 to flow into the auxiliary fluid chamber 30 by way of the throttle passage thereby damping engine vibration.

Additionally, upon input of engine vibration, a cyclical load is applied to the side plate 14 thereby generating stress therein. With the present embodiment, this stress can be dispersed to two corners B and C. Accordingly, durability can be increased.

Furthermore, the partition 24 can be formed easily by press-forming because it merely includes the circular central part 42 and the L-shaped peripheral part 44. This geometry reduces manufacturing costs.

In addition, the throttle passage can be made long because it is defined by the obliquely and outwardly inclining lower part 15 which is farthest from the axial center of the device. This arrangement increases freedom in designing the device.

Figure 3:
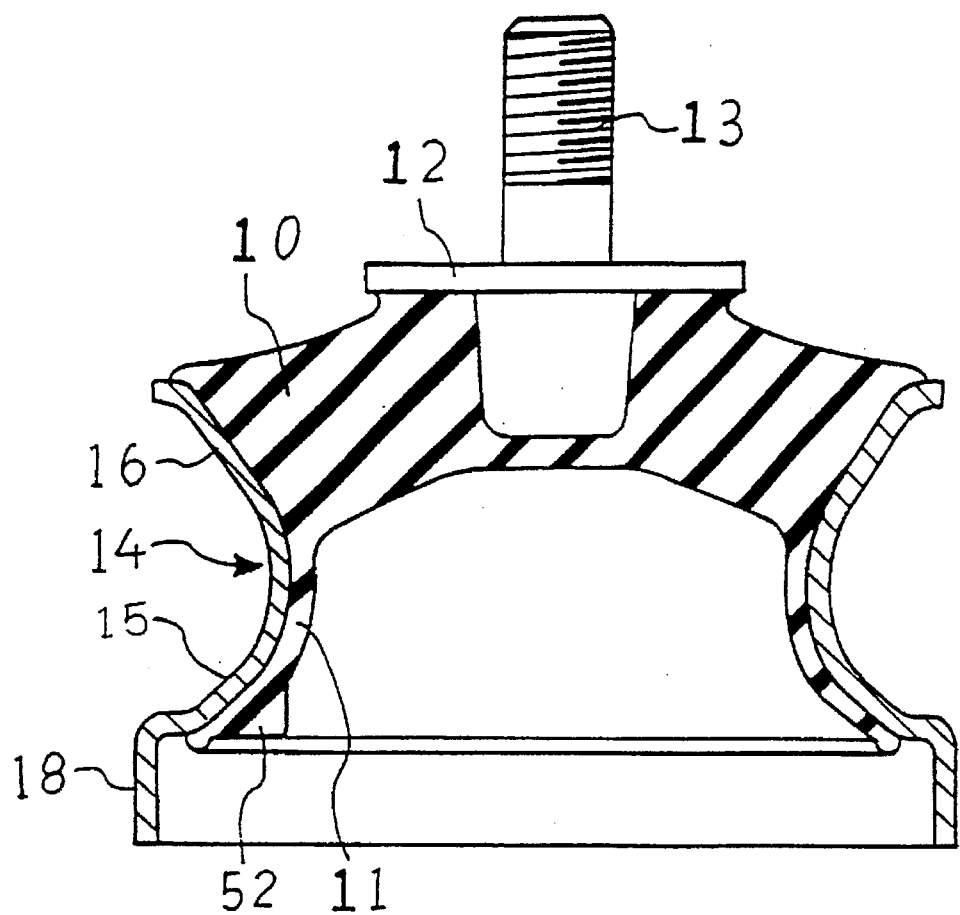
FIG. 3 is a longitudinal sectional view of a rubber body used in a second embodiment of the fluid-filled vibration isolator in accordance with the present invention.
Figure 4:
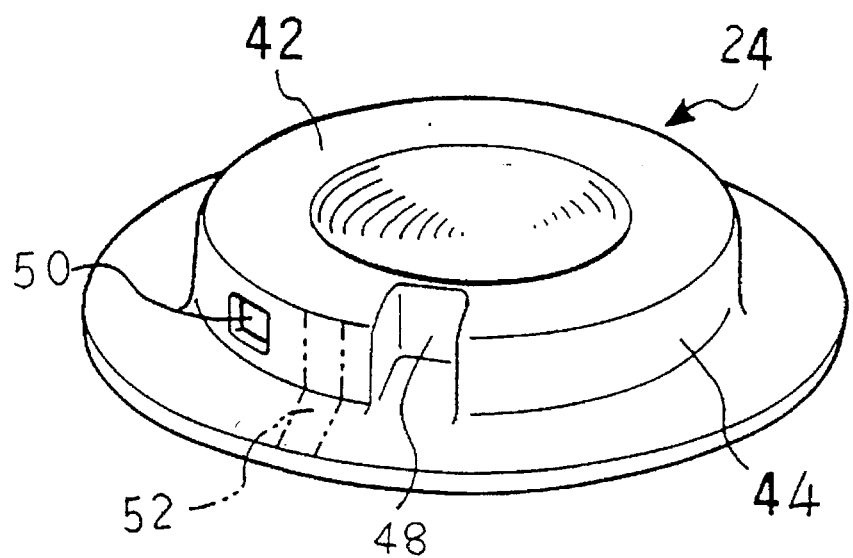
FIG. 4 is a perspective view of a partition used in the second embodiment.
Figure 5:
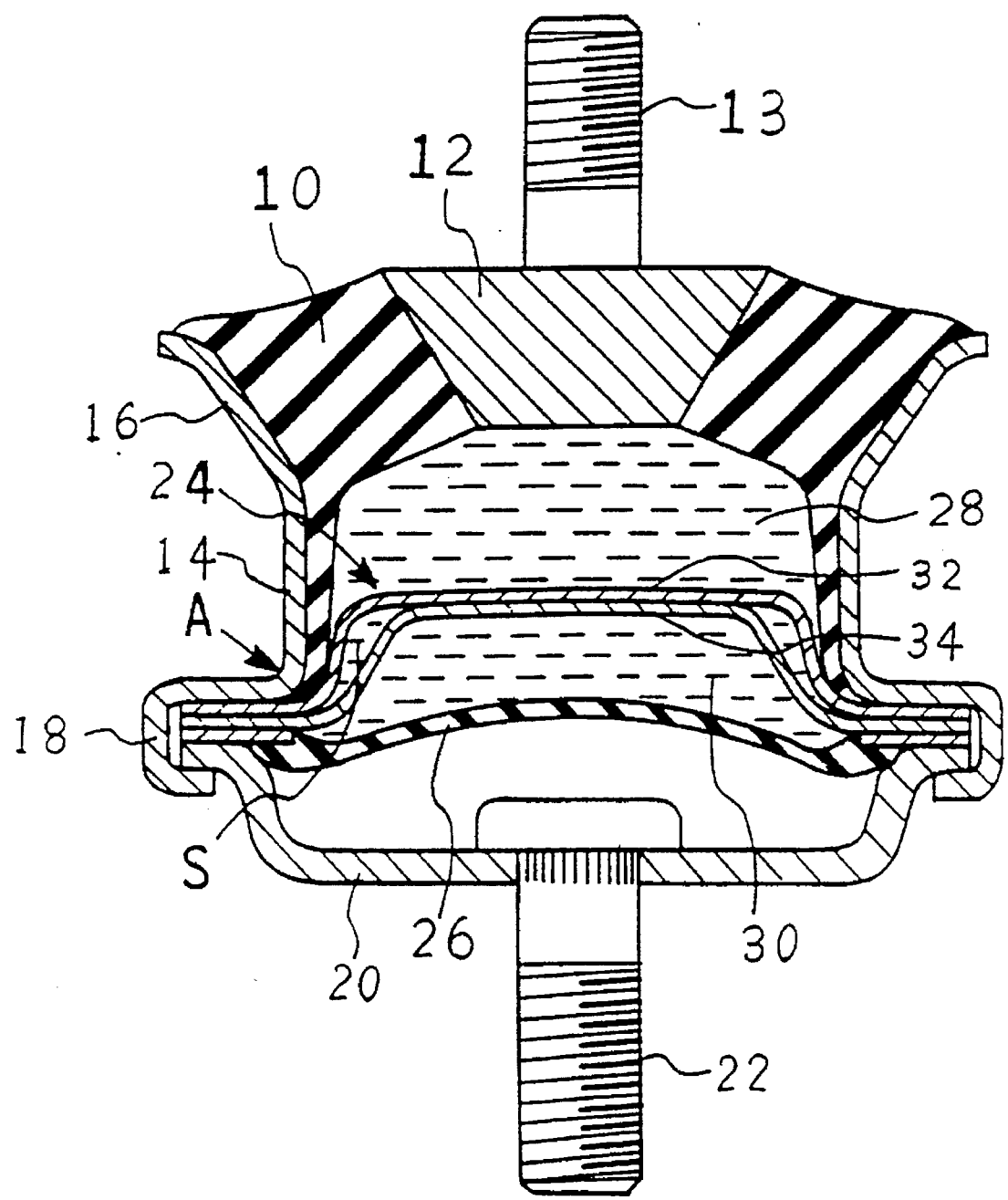
FIG. 5 is a longitudinal sectional view of a conventional fluid-filled vibration isolator.
Figure 6:
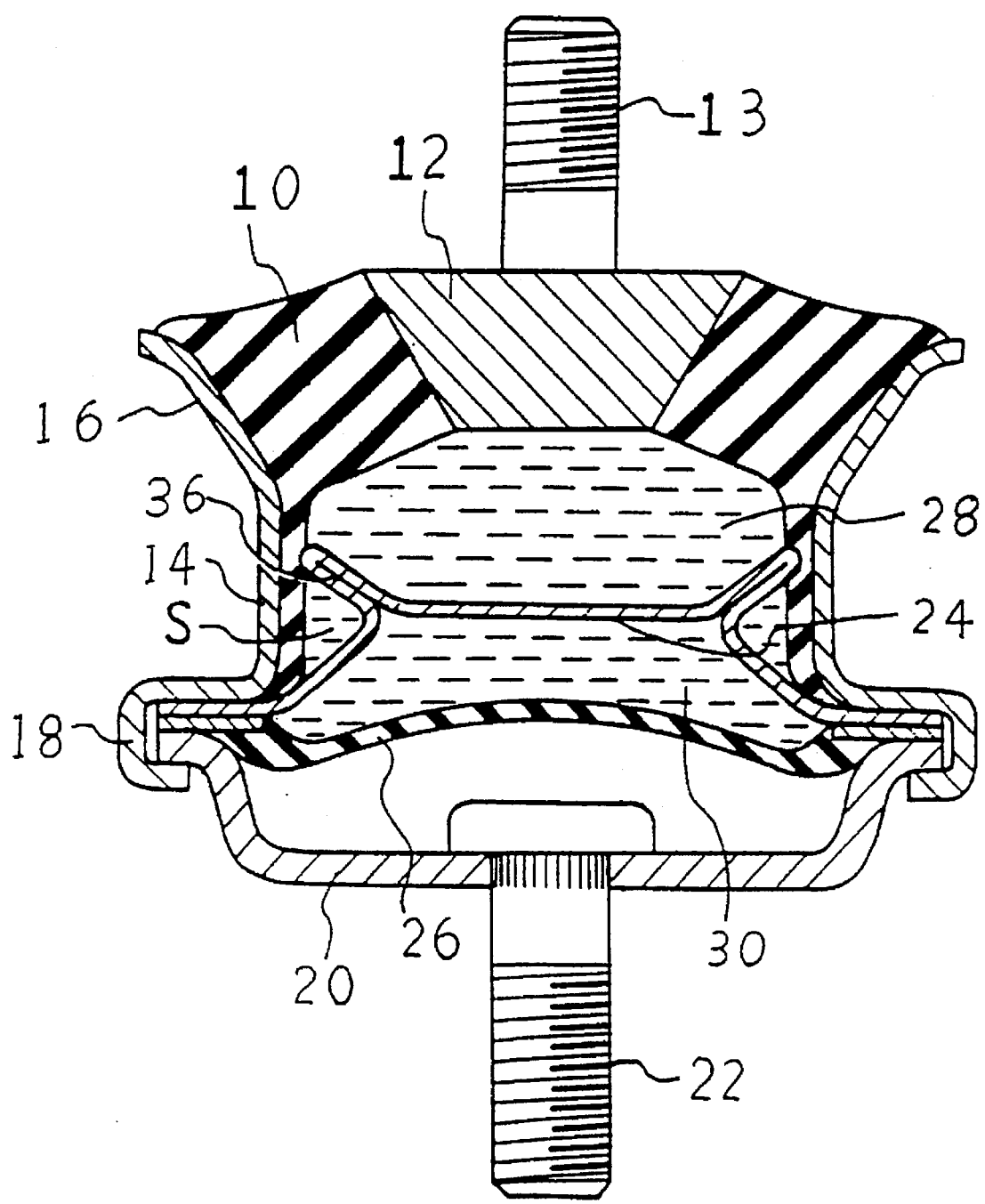
FIG. 6 is a longitudinal sectional view of another conventional fluid-filled vibration isolator.

FIGS. 3 and 4 illustrate a second embodiment of a fluid-filled vibration isolator in accordance with the present invention. As shown in FIG. 3, a projecting wall 52 is formed not in the partition 24 but in the rubber body 10. A rubber layer 11 which extends downwardly from the rubber body 10 along the inner surface of the side plate 14 projects inwardly from a lower end thereof to provide the projecting wall 52. The projecting wall 52 has a triangular cross-section. Upon installation of the partition 24 (FIG. 4) within the side plate 14, the edge of the projecting wall 52 contacts the cylindrical part 44 (shown by chain lines in FIG. 4) thereby circumferentially blocking the annular space S (FIG. 1) between the recess 48 and the through hole 50.

In the second embodiment, the central part 42 of has a concavely curved circular dent to improve the strength thereof and to prevent interference with the inside face of the rubber body 10 when it deforms downwardly upon input of engine vibration.

The second embodiment of the fluid-filled vibration isolator has operational effects like those of the first embodiment.

As described above, the fluid-filled vibration isolator in accordance with the present invention this constructed simply, and accordingly, the manufacturing costs can be reduced. In addition, good durability can be obtained.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A fluid-filled vibration isolator comprising:

a hollow, thick-walled, rubber body which opens downwardly;

an annular side plate having an upper part bonded to an outer surface of said rubber body;

a bottom plate secured to a lower end edge of said annular side plate;

a partition; and a rubber diaphragm, peripheral edges of said partition and said rubber diaphragm being sandwiched strongly by said lower end edge to define a main fluid chamber between said rubber body and said partition on the upper side of said partition, and define an auxiliary fluid chamber between said partition and said rubber diaphragm on the lower side of said partition, a lower part of said annular side plate inclining obliquely and outwardly toward said lower end edge, said peripheral edge of said partition bending into an L-shaped cross-section to define an annular space with said lower part of said annular side plate, said annular space opening into both said main fluid chamber and said auxiliary fluid chamber to define a throttle passage.

2. The fluid-filled vibration isolator according to claim 1, wherein said partition has a substantially circular hat-like configuration, and is composed of a circular central part and a cylindrical peripheral part having an L-shaped cross-section, said cylindrical peripheral part extending downwardly from an entire edge of said central part and further bending horizontally outwardly as a flange.

3. The fluid-filled vibration isolator according to claim 1, wherein said annular space is circumferentially blocked by a projecting wall.

4. The fluid-filled vibration isolator according to claim 3, wherein said annular space opens into said main fluid chamber by way of a recess provided in said central part of said partition adjacent to said projecting wall, and opens into said auxiliary fluid chamber by way of a through hole provided in said cylindrical peripheral part of said partition on a side of said projecting wall opposite to said recess.

5. The fluid-filled vibration isolator according to claim 1, wherein said partition is formed from a single plate by press-forming.

6. The fluid-filled vibration isolator according to claim 3, wherein said projecting wall is provided by projecting one part of one of said partition and said rubber body.

7. The fluid-filled vibration isolator according to claim 2, wherein said partition has a concavely curved circular dent at a center of said central part.

8. The fluid-filled vibration isolator according to claim 1, wherein said bottom plate is sealed by caulking.

9. The fluid-filled vibration isolator according to claim 1, wherein said annular space has a triangular cross-section.

10. A fluid-filled vibration isolator comprising:

a hollow, thick-walled, rubber body which opens downwardly;

an annular side plate having an upper part bonded to an outer surface of said rubber body;

a bottom plate secured to a lower end edge of said annular side plate;

a press formed partition comprised of a single plate including a peripheral edge; and a rubber diaphragm having a peripheral edge, wherein a portion of said press-formed partition having an interior section, radially inboard of the peripheral edge, being in an abutting relationship with the rubber body to thereby define a main fluid chamber between said rubber body and an upper surface of the partition, the peripheral edges of said partition and said rubber diaphragm being sandwiched within said lower end edge to define an auxiliary fluid chamber between said rubber diaphragm and a lower surface of the partition, and to define an annular space between the annular side plate, said interior section, and said peripheral edge, said annular space opening into both said main fluid chamber and said auxiliary fluid chamber to define a throttle passage.

* * * * *